(12) United States Patent
Krishnan et al.

(10) Patent No.: US 7,912,091 B1
(45) Date of Patent: Mar. 22, 2011

(54) TRAFFIC FORWARDING IN A TRAFFIC-ENGINEERED LINK AGGREGATION GROUP

(75) Inventors: Ram Krishnan, Sunnyvale, CA (US); Prakash Kashyap, Cupertino, CA (US)

(73) Assignee: Extreme Networks, Inc., Santa Clara, CA (US)

(*) Notice: Subject to any disclaimer, the term of this patent is extended or adjusted under 35 U.S.C. 154(b) by 210 days.

(21) Appl. No.: 12/406,790

(22) Filed: Mar. 18, 2009

(51) Int. Cl.
*H04L 12/56* (2006.01)
(52) U.S. Cl. .................................... 370/490; 709/224
(58) Field of Classification Search ................ 370/490, 370/400, 390, 389, 392, 244, 401; 709/224
See application file for complete search history.

(56) References Cited

U.S. PATENT DOCUMENTS

| | | | |
|---|---|---|---|
| 7,194,538 B1 * | 3/2007 | Rabe et al. | 709/224 |
| 7,317,722 B2 * | 1/2008 | Aquino et al. | 370/390 |
| 7,561,571 B1 * | 7/2009 | Lovett et al. | 370/392 |
| 7,633,955 B1 * | 12/2009 | Saraiya et al. | 370/401 |
| 7,720,066 B2 * | 5/2010 | Weyman et al. | 370/390 |
| 7,792,046 B2 * | 9/2010 | Kucharczyk et al. | 370/244 |
| 2004/0165588 A1 * | 8/2004 | Pandya | 370/389 |
| 2006/0198381 A1 * | 9/2006 | Elangovan et al. | 370/400 |
| 2007/0036178 A1 * | 2/2007 | Hares et al. | 370/490 |

* cited by examiner

*Primary Examiner* — Thong H Vu
(74) *Attorney, Agent, or Firm* — Blakely Sokoloff Taylor & Zafman LLP

(57) ABSTRACT

A data packet is received at a network switch. The packet has a destination address that is reached via a Link Aggregation group on a virtual local area network (VLAN). A forwarding database lookup is performed to determine a Link Aggregation port reference number for the data packet on the VLAN. A Link Aggregation port table is then searched to determine the primary Link Aggregation port and a backup Link Aggregation port for forwarding the packet. A port array for ports in the Link Aggregation group is searched to determine if the primary Link Aggregation port is valid. If the primary port is valid, then the packet is forwarded on the primary Link Aggregation port. If the primary port is not valid, then the packet is forwarded on the backup Link Aggregation port.

14 Claims, 2 Drawing Sheets

TRAFFIC FORWARDING IN A TRAFFIC-ENGINEERED LINK AGGREGATION GROUP

FIELD

Embodiments described herein related to packet forwarding in a network, and more particularly to packet forwarding within a Link Aggregation Group on a network.

BACKGROUND

Link Aggregation is a computer networking term describing the use of multiple network cables, or ports, in parallel to increase link speed beyond the limits of any one single cable, or port, and to increase redundancy for higher availability. Most implementations of Link Aggregation conform to the IEEE (Institute of Electrical and Electronics Engineers) 802.3-2005 Ethernet standard. Other terms for Link Aggregation include, for example, "ethernet trunk," "NIC teaming," "port channel," "port teaming," "port trunking," "link bundling," "Ethernet channel," "multilink trunking," "NIC bonding," and "network fault tolerance."

A processing engine in a network switch is responsible for Link Aggregation of switched packets. The processing engine handles unicast and multicast forwarding, as well as packet flooding. The processing engine may also support hash-based Link Aggregation for Open Systems Interconnection (OSI) Layer 2 and Layer 3 switched packets, as well as pseudowire switched packets. For Layer 3, the processing engine may include Equal Cost Multi-Path (or ECMP) support, as well.

The most common way to balance traffic in a Link Aggregation group (LAG) is using Layer 3 hashes. These hashes are calculated when the first LAG connection is established and are then kept in a network device's memory for future use. This effectively limits the client bandwidth in an aggregate to its single member's bandwidth per session.

In a traffic-engineered LAG, users are often able to pick a primary port and a backup port within a virtual local area network (or VLAN). One of the weaknesses of a traditional processing engine (with respect to Link Aggregation) is the need to perform a content addressable memory (or CAM) lookup (e.g., a ternary CAM or TCAM lookup) to acquire information regarding the primary and backup port for forwarding packets in a Link Aggregation group. Solutions based on a TCAM lookup have various scalability and performance issues. For example, in a traditional network device or switch, when an incoming packet is received, the packet's destination address is used in a forwarding database lookup to determine the Link Aggregation group to which the packet should be forwarded. Then, based on the Link Aggregation group and the VLAN identification (VLAN ID) associated with the packet, a TCAM lookup is performed to determine the primary port for forwarding the packet. However, if the primary port is not functioning/operational (e.g., if a link is down in the software), then the lookup process must be repeated to determine the backup port, which can slow down the forwarding process. Additionally, this process requires that there be separate entries in the TCAM for both the primary port and the backup port, which creates a scalability issue, inasmuch as storage in a TCAM is expensive.

SUMMARY OF THE DESCRIPTION

A data packet is received at a network switch. The packet has a destination address that is reached via a Link Aggregation group on a virtual local area network (VLAN). A forwarding database lookup is performed to determine a Link Aggregation port reference number for the data packet on the VLAN. A Link Aggregation port table is then searched to determine the primary Link Aggregation port and a backup Link Aggregation port for forwarding the packet. A port array for ports in the Link Aggregation group is searched to determine if the primary Link Aggregation port is valid. If the primary port is valid, then the packet is forwarded on the primary Link Aggregation port. If the primary port is not valid, then the packet is forwarded on the backup Link Aggregation port.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As provided herein, methods, apparatuses, and systems facilitate packet forwarding within a Link Aggregation group. Rather than requiring both a forwarding database lookup and a Link Aggregation port table lookup to determine primary and backup ports for forwarding the packet, embodiments described herein allow a packet to be forwarded, based on just a forwarding database lookup, followed by a search of a Link Aggregation port array, to determine forwarding for a packet.

Figure 1:
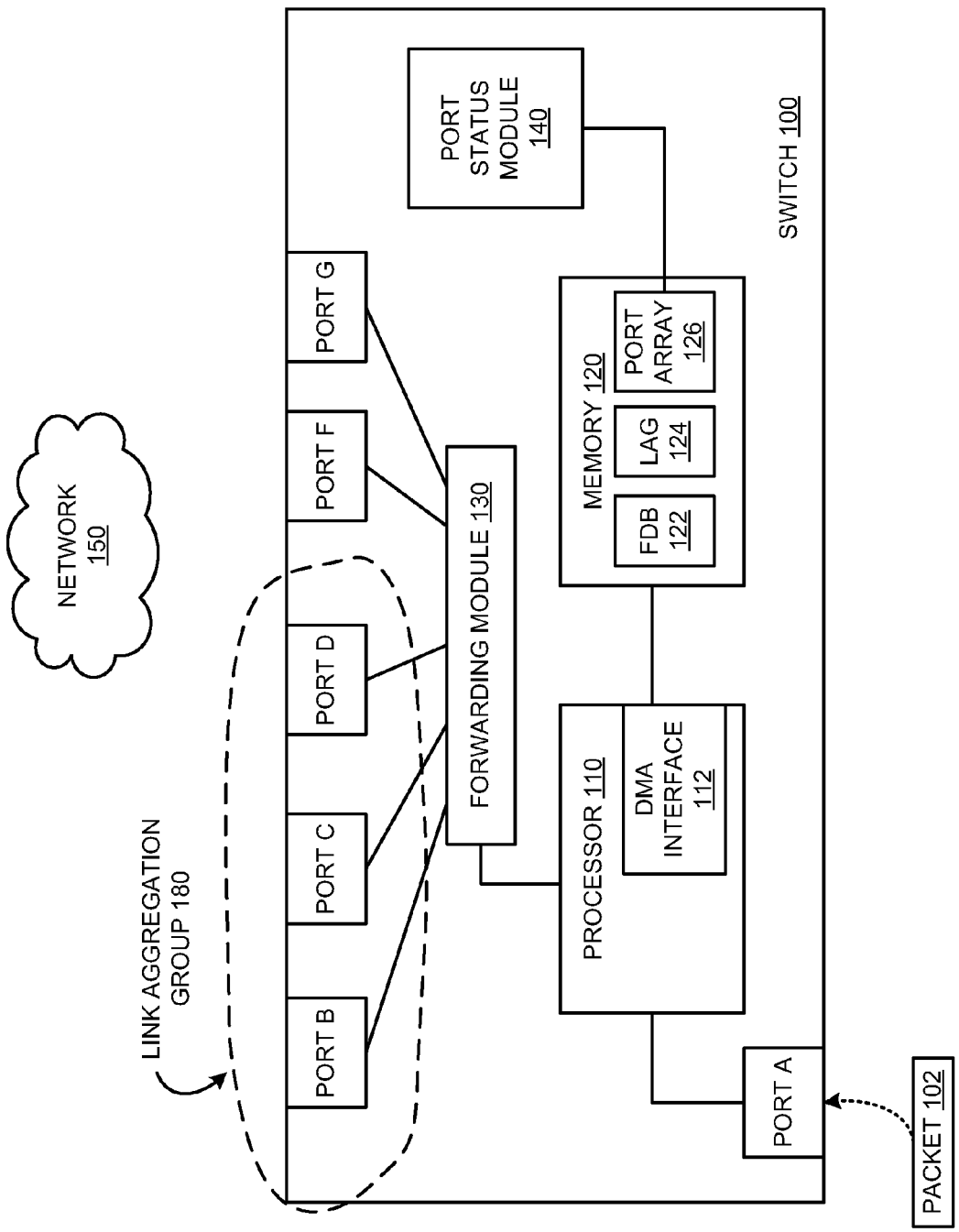
FIG. 1 is a block diagram illustrating a system according to various embodiments.

FIG. 1 is a block diagram, according to various embodiments. Switch 100 is a network switch having a plurality of ports. Network switch 100 can be any type of device that is used for forwarding, or routing, of packets. In other words, in various embodiments, a network switch could be a Layer 2 bridge, a Layer 3 switch (or router), or any other known network device. As shown, switch 100 includes multiple ports, a processor 110, a memory 120, a forwarding module 130, and a port status module 140.

In an example, a packet 102 is received at port A on switch 100. That packet is then handled by processor 110. Processor 110 can be any type of processing device, including a network processor, a system on a chip (SoC), a central processing unit (CPU), etc.

Processor 110 performs a forwarding database lookup to determine a Link Aggregation port reference number for packet 102. Processor 110 accesses memory 120 via a direct memory access interface 112. Other types of interfaces for accessing memory can be used in other embodiments. In particular, processor 110 accesses forwarding database 122. A "forwarding database," as used herein, refers to a database, or table, having forwarding entries stored in memory. Sometimes a forwarding database is referred as a routing table. For the purposes of discussion herein, any table or database containing entries for forwarding data packets on the network can be considered a forwarding database. Additionally, memory 120 can be any type of memory used in the network device, such as, for example, RAM, TCAM, flash memory, etc.

The forwarding database entries stored in forwarding database 122 include information used by the processor 110 for forwarding packet 102. Included in the forwarding database entries is a Link Aggregation port reference number. In various embodiments, the Link Aggregation port reference number is a single number that indicates both the primary port and the backup port for forwarding a packet in a Link Aggregation group. A simple Link Aggregation port table translates the Link Aggregation port reference number into a primary port and a backup port. For example, if processor 110 accesses forwarding database 122 to determine forwarding ports for packet 102, the forwarding database entry associated with the destination address in the packet header of packet 102 might include the port reference number "10,000." A simple lookup of the port reference number 10,000 might indicate port 10 and port 11 as being the primary and backup ports, respectively. If the Link Aggregation port reference number were number 20,000, a lookup in the Link Aggregation port table might indicate ports 10 and 12 as the primary and backup ports. The translation scheme between the Link Aggregation port reference number and actual primary and backup ports is not germane to the various embodiments described herein and will not be discussed further. It is sufficient for the purposes of this disclosure to say that any type of translation scheme may be used.

Forwarding database entries are initially "learned" or added to the forwarding database based on a VLAN tag and a source address (e.g., source Media Access Control (MAC) address). At the time of learning the entry, the Link Aggregation port reference number is added to the entry. In this way, when a forwarding database lookup is performed based on a VLAN tag and a destination address, the lookup returns the Link Aggregation port reference number.

Once Link Aggregation group table 124 has been accessed by processor 110 and the primary and backup ports for packet 102 have been determined, processor 110 accesses port array 126 to determine the operational status of the primary port. In various embodiments, port array 126 is an array of bits where each port is represented by one bit. A different number of bits could be used to represent each port in other embodiments. If a port is known to be functional and/or operational, then the bit for that port is set, for example, high (e.g., to 1). Of course, an operational port could just as easily be represented by setting the bit low (e.g., to 0). Assuming that a functional port is represented by 1 in the port array, then if a port is known not to be operational (i.e., the port, or link, etc. is down), then the bit for that port is changed (e.g., set low to 0). In this way, processor 110 can quickly and simply index port array 126 using the primary port number to determine if the primary port is valid. If the primary port for the packet is indeed valid, then the packet is forwarded by forwarding module 130 on the identified primary port out to network 150. If, however, the port array 126 indicates that the primary is not operational, then the packet will be forwarded on the backup port by forwarding module, 130.

In various embodiments, if the port array 126 indicates that the primary port is not operational, processor 110 may index the port array 126 again to determine whether the backup port is operational. If both the primary and backup ports are not operational, then a failed report may be used to forward the packet. In some situations, if both the primary and backup ports are not operational, then the packet cannot be forwarded and will be dropped, necessitating that the packet be resent.

During operation of switch 100, the port status module 140 continually monitors the operational status of the ports in the Link Aggregation group. Thus, as shown in FIG. 1, port status module 140 monitors ports B, C and D. Port status module 140 may monitor ports for multiple LAGs in some embodiments. However, port status module 140 can also monitor ports that are not a part of a Link Aggregation group, such as ports F and G. Based on the monitoring of ports, port status module 140 continually, in real-time, updates port array 126. In this way, port array 126 is always up to date and accurately indicates whether the primary port, or backup port, is operational at any point in time.

Figure 2:
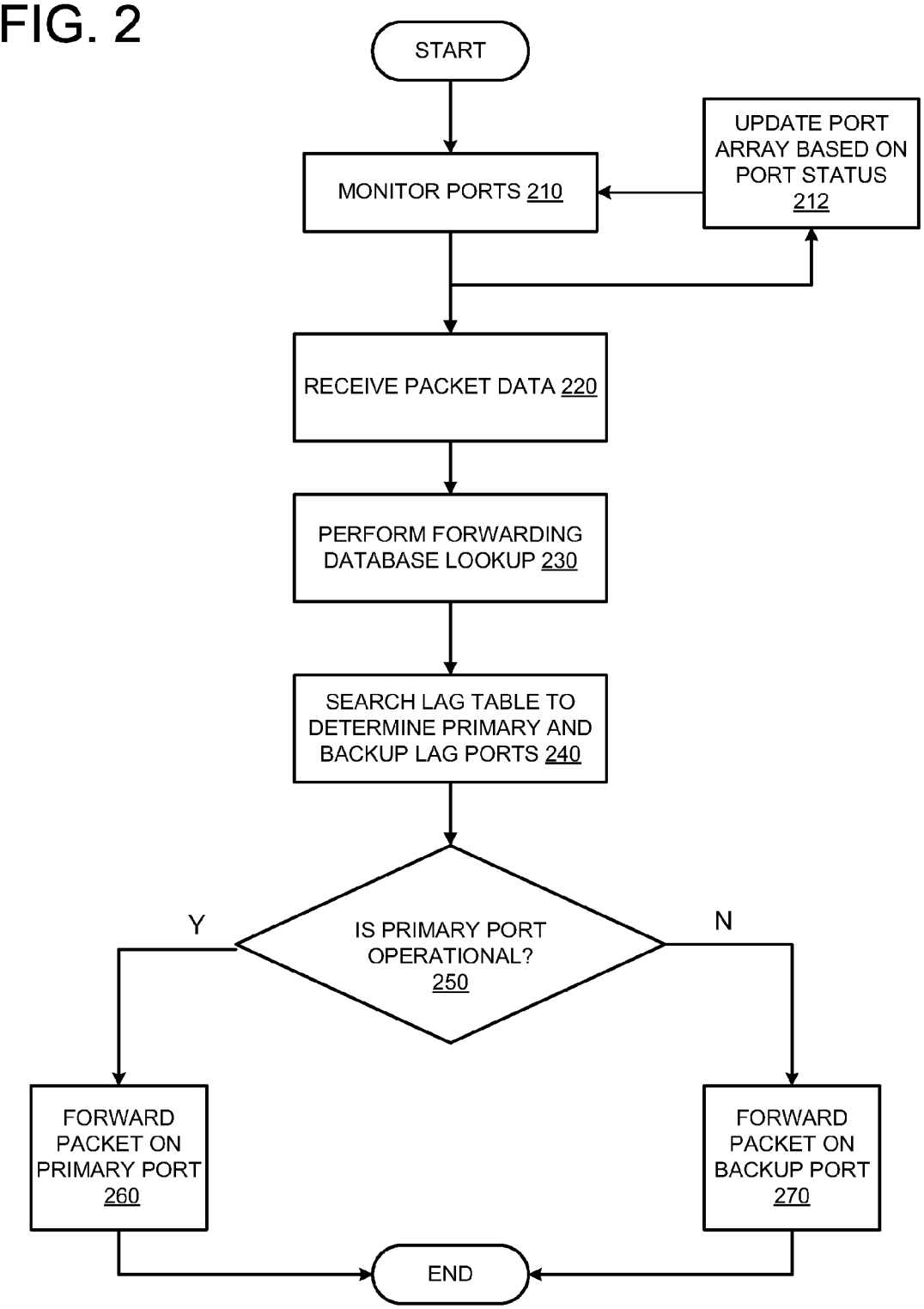
FIG. 2 is a flow diagram of operation in a system according to various embodiments.

FIG. 2 is a flow diagram of operation according to various embodiments. As part of the operational flow, the Link Aggregation ports are monitored 210. Based on the monitoring, a port status module updates 212 the port array to indicate the current operational status of each port. In some embodiments, the port status module receives an indication from a port when the port goes down, or otherwise becomes inactive. In other embodiments, the port status module could send a ping message to each port, wherein the failure to receive or respond to the ping message indicates that a port is not operational. Regardless of the way in which information regarding a port status is retrieved, once that information is known, the port status module will update the port array.

A data packet is received 220 at a port on the network device. The packet will have in its header at least a destination address, which can be used to perform 230 a forwarding database lookup. As discussed above, a forwarding database refers to a database, or table, having forwarding entries stored in memory. Entries in the forwarding database include an indication (e.g., a field in a table) of a Link Aggregation port reference number. The Link Aggregation port reference number can be included anywhere in a forwarding database entry. Based on the Link Aggregation port reference number, a Link Aggregation group table is searched 240 to determine the primary and backup Link Aggregation ports for forwarding the received data packet.

It is then determined 240 whether the indicated primary port is operational. A port's operational status is determined by indexing a Link Aggregation port array using the Link Aggregation port reference number. Each Link Aggregation port is represented by one bit in the port array. In other embodiments, more than one bit could be used for each Link Aggregation port. If the port array indicates that a primary port is operational, then the received packet is forwarded to its destination on the primary port, 250. If the port array indicates that the primary port is not operational, then the packet is forwarded, 260, onto the backup port. In some embodiments, the port array may be indexed a second time to see if the backup port is operational before forwarding the packet on the backup port. If neither the primary or backup ports is operational, a universal failure port could be used to forward the packet or the packet may simply be dropped.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a memory on a remote computer (e.g., a server) to a memory on a requesting computer (e.g., a client).

Various components described herein may be a means for performing the functions described herein. Each component described herein includes software, hardware, or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense.

What is claimed is:

1. A method, comprising:
   receiving a data packet at a network switch, the packet having a destination address that is reached via a Link Aggregation group on a virtual local area network (VLAN);
   performing a forwarding database lookup to determine a Link Aggregation port reference number for the data packet on the VLAN;
   searching a Link Aggregation port table to determine a primary Link Aggregation port and a backup Link Aggregation port for forwarding the packet based at least on the Link Aggregation port reference number;
   searching a port array to determine if the primary Link Aggregation port is valid;
   forwarding the packet on the primary Link Aggregation port if the primary port is valid; and
   forwarding the packet on the backup Link Aggregation port if the primary port is not valid.

2. The method of claim 1, wherein each Link Aggregation port in the port array is represented by 1 bit.

3. The method of claim 1, wherein performing the forwarding database lookup comprises directly accessing a forwarding table in hardware.

4. The method of claim 1, wherein performing the forwarding database lookup comprises accessing a software forwarding table.

5. The method of claim 2, further comprising:
   setting a bit in the port array corresponding to a Link Aggregation port when the Link Aggregation port is operational; and
   resetting the bit in the port array corresponding to the port when the Link Aggregation port is not operational.

6. A Non-transitory machine accessible storage medium containing instructions that, when executed, cause a machine to:
   receive a data packet at a network switch, the packet having a destination address that is reached via a Link Aggregation group on a virtual local area network (VLAN);
   perform a forwarding database lookup to determine a Link Aggregation port reference number for the data packet on the VLAN;
   search a Link Aggregation port table to determine a primary Link Aggregation port and a backup Link Aggregation port for forwarding the packet based at least on the Link Aggregation port reference number;
   search a port array to determine if the primary Link Aggregation port is valid;
   forward the packet on the primary Link Aggregation port if the primary port is valid; and
   forward the packet on the backup Link Aggregation port if the primary port is not valid.

7. The Non-transitory machine accessible storage medium of claim 6, wherein each Link Aggregation port in the port array is represented by 1 bit.

8. The Non-transitory machine accessible storage medium of claim 6, wherein the instructions to perform the forwarding database lookup comprise further instructions that cause the machine to directly access a forwarding table in hardware.

9. The Non-transitory machine accessible storage medium of claim 6, wherein the instructions to perform the forwarding database lookup comprise further instructions that cause the machine to access a software forwarding table.

10. The Non-transitory machine accessible storage medium of claim 7, comprising further instructions that cause the machine to:
    set a bit in the port array corresponding to a Link Aggregation port when the Link Aggregation port is operational; and
    reset the bit in the port array corresponding to the port when the Link Aggregation port is not operational.

11. A network switch, comprising:
    at least one port to receive a data packet, the packet having a destination address that is reached via a Link Aggregation group on a virtual local area network (VLAN);
    a memory to store a forwarding database; and
    a processor to perform a forwarding database lookup to determine a Link Aggregation port reference number for the data packet on the VLAN;
    the processor further to search a Link Aggregation port table to determine a primary Link Aggregation port and a backup Link Aggregation port for forwarding the packet based at least on the Link Aggregation port reference number;
    the processor further to search a port array to determine if the primary Link Aggregation port is valid;
    a forwarding module to forward the packet on the primary Link Aggregation port if the primary port is valid; and
    the forwarding module to forward the packet on the backup Link Aggregation port if the primary port is not valid.

12. The system of claim 11, wherein each Link Aggregation port in the port array is represented by 1 bit.

13. The system of claim 11, wherein the processor further comprises a direct memory access interface to directly access the forwarding database in memory.

14. The system of claim 12, further comprising:
    a port status module to determine an operational status of a Link Aggregation port;
    the port status module to set a bit in the port array corresponding to a Link Aggregation port when the Link Aggregation port is operational; and
    the port status module to reset the bit in the port array corresponding to the port when the Link Aggregation port is not operational.

* * * * *